United States Patent

[11] 3,593,949

| [72] | Inventor | Henry J. Fliege<br>1618 W. Margaret Ave., Peoria, Ill. 61604 |
|---|---|---|
| [21] | Appl. No. | 852,367 |
| [22] | Filed | Aug. 22, 1969 |
| [45] | Patented | July 20, 1971 |

[54] POLE HOLDER
8 Claims, 9 Drawing Figs.

[52] U.S. Cl. ............................................. 248/42,
248/125, 248/157, 287/58
[51] Int. Cl. ....................................... F16m 13/00,
A01k 97/10
[50] Field of Search............................................ 248/38-
—42, 46, 47, 125, 157, 175, 295, 298, 413;
43/21.2

[56] References Cited
UNITED STATES PATENTS
1,570,581  1/1926  Stuart........................  248/413
2,689,909  9/1954  Dazley.......................  248/315 X
2,787,431  4/1957  Smith........................  248/42
2,870,833  1/1959  Posnansky..................  248/298 X Primary Examiner—William H. Schultz
Attorney—Davis, Lucas, Brewer and Brugman ABSTRACT: A fishing pole or rod holding device formed with a wire framework suitably shaped to provide a pair of parallel spaced legs clamped by adjustable fasteners to a rigid mounting member adapted to be anchored in the ground or secured to the side of a boat, for example. Adjustment of the fasteners regulates rotational freedom of the legs relative to the mounting member, permitting the pole, held in the framework, to pivot arcuately relative to the stationary mounting member. During such pivoting action portions of the framework are torsionally loaded to resiliently resist the pivoting action and thereby urge the pole toward a central or neutral position. A generally U-shaped arm having a looped portion and an open throat receive the handle or butt end of the pole for maintaining the latter in the holding device.

Inventor
Henry J. Fliege
By Davis, Lucas, Brewer & Brugman
Attys.

3,593,949

POLE HOLDER

BACKGROUND OF THE INVENTION

This invention relates generally to holding devices, and particularly to improvements in devices for removably holding fishing poles, rods and the like.

In the art of angling, it has been found most convenient and desirable to provide devices for the unattended holding of rods and poles so that a fisherman may angle with several poles and lines at one time. The ideal holder for such purpose should be lightweight portable, simple to operate and readily anchorable to the ground, boat, fishing pier or other support. Further the holder should firmly and securely hold the pole in operation and maintain the same in proper disposition for angling while having the capability of following and playing a hooked fish until the fisherman can man the pole. To the latter end it is necessary that the holder provide for quick loading and removal of the pole or rod. It is also desirable that the holder provide a certain degree of flexibility or give in addition to that of the pole to avoid breaking the pole and as an aid in maintaining a taut line when a fish has been hooked and the pole and line are unattended. Such features have not been available heretofore in pole holders of the prior art.

SUMMARY OF THE INVENTION

To furnish the foregoing features and to overcome other difficulties and problems characteristic of prior devices of this type, it is a general object of this invention to provide a new and improved holder for fishing poles and rods.

The holder of the present invention is featured by a resilient wire framework adjustably clamped to a rigid mounting means adapted to be securely anchored to the ground or other support. A pole is operatively supported at its handle end by and between a closed loop portion and an open throat portion of the framework and an intermediate portion is suitably formed to permit quick mounting and removal of the pole. Construction of the framework permits a pole held thereby to pivot resiliently about the rigid mounting means with portions of the framework rolling or rotating frictionally against the mounting means while other portions of the framework are torsionally loaded and twisted to elastically resist such pivoting movement. Frictional resistance or drag to the rolling or rotating movement of the framework portions is varied according to selected clamping pressure between the mounting means and the framework, as provided by adjustable fastener means. Axial adjustment of the framework on the mounting means is also afforded by the fastener means.

Thus, one of the important objects of this invention is to provide an improved fish pole holder which is readily portable and which can be anchored to the ground or other support means.

It also is an object of this invention to provide an attendant-free holding device for maintaining a fishing pole or the like in proper angling position and which is capable of following a fish hooked to the pole.

Another object of this invention is to provide a pole holder as aforesaid having means for quickly loading and unloading a pole therefrom.

Still another object of this invention is to provide a fish pole holder which has adjustably variable flexibility for regulating pivotal movement of a pole mounted therein.

It is still further object of this invention to provide a durable lightweight pole holder which is simple to use, economical to produce and utilizes a minimum number of parts, readily available from materials which lend themselves to mass production techniques.

Further and other objects and a more complete understanding of the invention will be had by referring to the following description and claims taken in conjunction with the accompanying drawings.

DESCRIPTION OF THE DRAWINGS

For the purpose of illustrating this invention, there is shown in the drawings forms which are presently preferred, it being understood, however, that this invention is not necessarily limited to the precise arrangements and instrumentalities illustrated.

Referring now to the drawings, wherein like numerals indicate like elements, FIG. 1 illustrates a pole holder 10 according to this invention, operationally holding a fishing pole 15 for bank fishing, the same being anchored to the ground 16. As shown best in FIGS. 2 and 3, the pole holder 10 includes a rigid mounting means 17 and a wire framework 18 interjoined by a plural fastener means 19.

Figure 1:
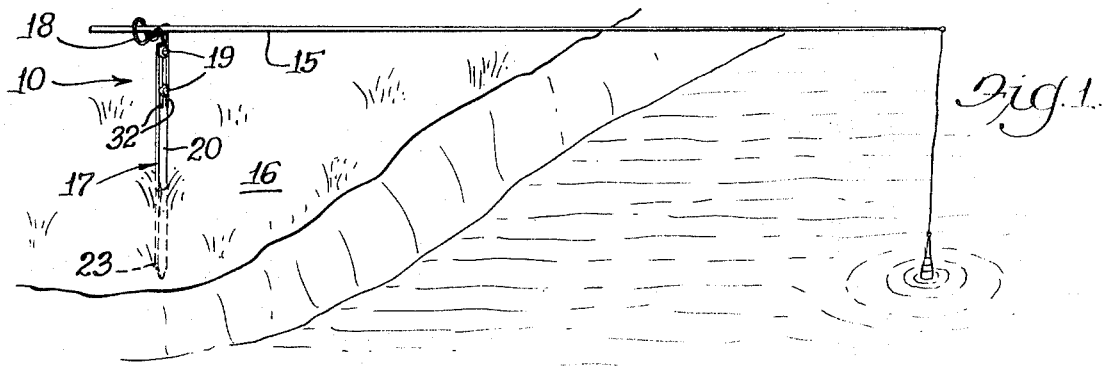
FIG. 1 is a perspective view showing a fishing pole disposed in the pole holder of the present invention arranged for bank fishing.

Mounting means 17 shown in FIG. 1, is formed as an elongated metal strap member 20 preferably stamped and cut from rigid material, such as cold rolled steel, and provided with a pair of spaced openings 22,22 formed therethrough, located adjacent the upper end thereof. The lower end 23 of the strap member is suitably pointed so that it may be easily driven or thrust into the ground 16 when anchoring the holder in operating position as exemplified in FIG. 1.

Figure 8:
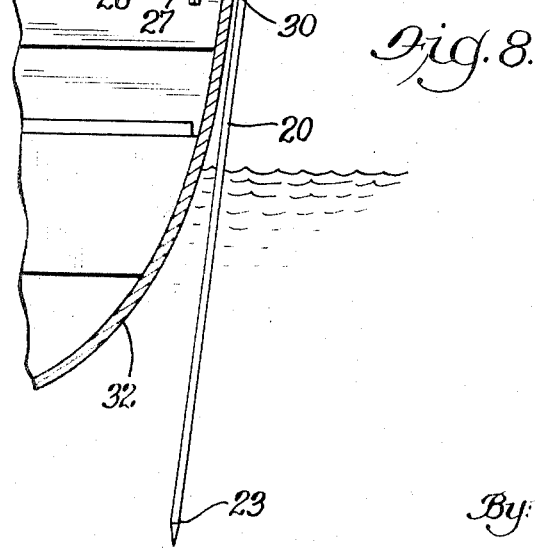
FIG. 8 is a view in side elevation with parts in section, showing a pole holder clamped to a boat gunnel.

An auxiliary mounting means, illustrated in FIG. 8, is provided for anchoring the holder to supports other than the ground. As therein shown, such auxiliary means comprises a generally Z-shaped metal bracket 25 having a clamping screw 26 threaded through one downwardly extending leg 27 which is joined to and paralleled by a second leg 28. Leg 28 is provided with spaced openings or slots receptive of the fastener means 19,19 which interjoin the framework and strap member 20. As shown, leg 28 is operationally mounted in superposing engagement with one face of the metal strap 20 opposite openings 22,22 therein for receiving the fastener means 19,19. When employing the auxiliary mounting means 25, the same may be placed over the gunnel 30 of a boat 31, for example (see FIG. 8), so that the screw means 26 may be threaded inwardly to engage the inside face of the gunnel. The strap member 20 extends along the outside of the gunnel and boat hull and cooperates with the screw means 26 to firmly clamp the holder in operating position as illustrated. It will be understood, of course, that the holder with the auxiliary mounting means may be similarly attached to other support means such as a dock or pier.

The framework 18 of the holder, as shown best in FIGS. 2—6 of the drawings, preferably is formed of heavy metal wire, rod or extruded plastic having a fair degree of stiffness or rigidity, yet reasonably flexible and elastic, especially under torsion loads. Framework 18 is best made of a single length of rodlike material symmetrically bent and formed to include a pair of parallel spaced support legs 32,32 comprising the free ends of the wire or rod. Spacing between such legs 32 is dimensioned to dispose the same within the lateral limits of the strap member 20 when the same is attached thereto by the fastener means 19 (see FIG. 3).

Two short arm portions 33,33 diverge outwardly from the upper ends of the two support legs 32 and form a generally Y-shaped open throat or yoke portion. As shown best in FIG. 2, arm portions 33 also tend, or are bent, slightly rearwardly away from the linear axes of the two support legs 32.

Figure 2:
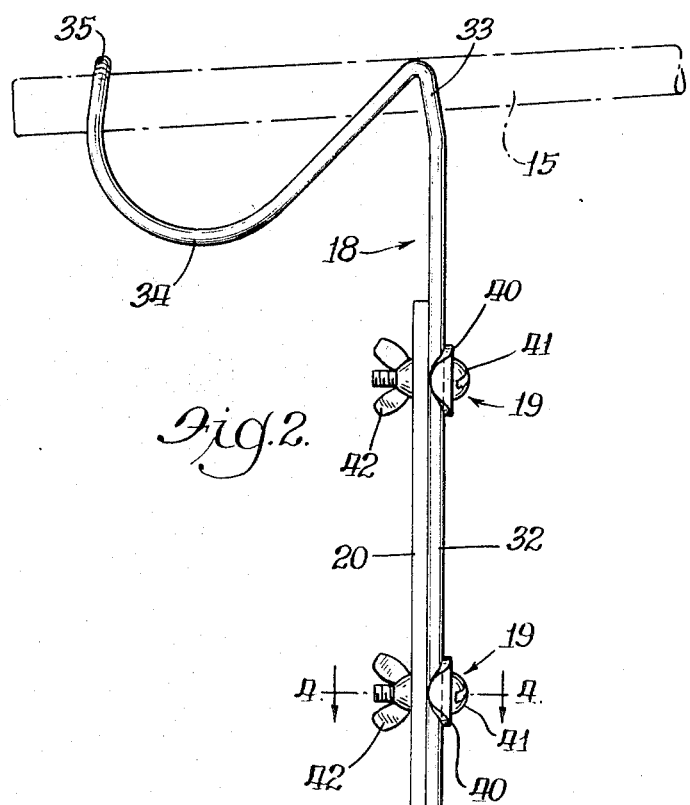
FIG. 2 is an enlarged partial view in side elevation of the pole holder shown in FIG. 1.
Figure 4:
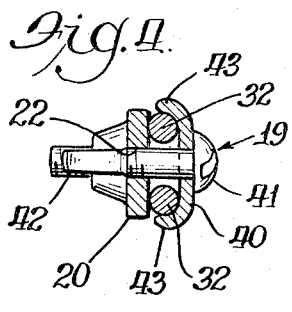
FIG. 4 is a view in cross section taken substantially along line 4,4 of FIG. 2 and looking in the direction of the arrows thereon.
Figure 3:
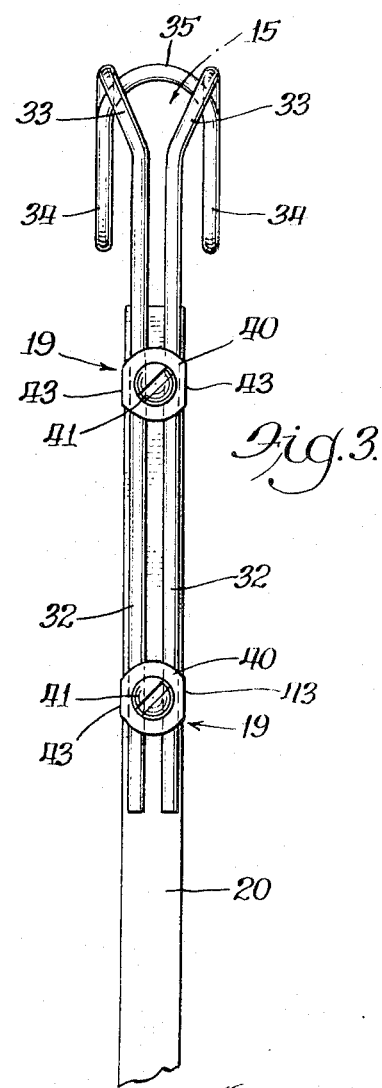
FIG. 3 is an enlarged partial view in front elevation thereof.

Extending rearwardly from the outer or upper ends of the two arm portions 33,33 are a pair of parallel spaced curved finger portions 34,34 each of which curves downwardly and then upwardly in a generally C-shaped profile or hook configuration, as best shown in FIG. 2. The outermost ends of the two finger portions 34 are integrally joined by a semicircular loop portion 35, closed along its upper side and having an arcuate center aligned generally coaxially with the base of the yoke or throat portion presented by the divergent arm portions 33,33 (see FIG. 3).

So formed, the loop portion at the rearwardmost end of the wire framework and the open yoke or throat portion of such framework, lie generally in parallel spaced planes and provide a most workable and stable support system for receiving and holding the butt or handle end of a fishing rod or pole. In this respect, it will be noted that in mounting a pole in the holder, the handle end thereof is passed through and beneath the loop portion 35 which fits over the upper side of the pole handle and restrains the same (see FIGS. 1 and 8). The yoke or open throat portion openly receives the pole engaging the underside thereof at a point spaced from its engagement by the loop portion, with the two arm portion 33,33 acting as a fulcrum so that the weight of the pole extending forwardly of the holder serves to press the handle end thereof tightly against the loop portion 35. Also the weight of the pole tends to bias arm portions 33 apart which is resisted by the resilient framework and thus sets up a secure frictional grip on the underside of the pole by the yoke portion. If desired rubber sleeves or the like may be placed about arm portions 33 to increase frictional gripping of the pole by the yoke portion. The curvilinear configuration of the finger portions 34 intermediate the yoke portion and the loop portion 35, importantly provides ample clearance to the operator or fisherman's hand to permit him to readily grasp the handle of the pole without interfering with the holder. This accessibility permits the easy, quick removal of the pole from the holder which is particularly important when a fish is hooked and the angler wishes to grab the pole to land the fish.

Figure 9:
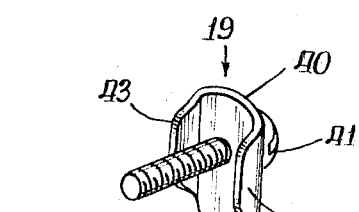
FIG. 9 is an enlarged perspective view showing fastener means utilized in the holder of this invention.

The adjustable fastener means 19, as best shown in FIGS. 2, 3, 4 and 9, are employed to secure the legs 32,32 of the wire framework to the strap or stake member of the mounting means. As herein illustrated, such fastener means may comprise a washer 40 fitted beneath the head of a threaded bolt 41 having an associated wingnut fastener 42. Each of the several fastener means 19 employed, is so comprised and is adapted to pass through one of the openings 22 formed in the strap member 20, as previously noted. As best shown in FIG. 9 of the drawings, each washer is shaped to form a channel cross section with parallel flange portions 43,43 turned inwardly toward the strap member at opposite lateral margins thereof. Threaded bolt 41 passes through the washer 40 via a central opening therein, and in operation passes between the parallel framework legs 32,32 and through an opposing opening 22 of the strap member. The wing nut 42 is then mounted on the outer threaded end of the bolt behind or on the opposite face of the strap from that engaged by the wire framework 18. It is to be noted in passing, with particular reference to FIG. 8, that the auxiliary mounting means 25 is also attached to the mounting member 20 by means of the threaded bolt and wingnut fasteners. For best results, at least two such fastener means should be utilized, at spaced positions. As shown best in FIG. 4 of the drawings the parallel spaced flange portions 43,43 on the washer members pass outwardly over the outside of the spaced leg portions 32,32 of the framework and prevent such leg portions from moving laterally outwardly from beneath the washers 40

From the foregoing description it will be immediately appreciated that the pole holder according to this invention is readily transportable and may be anchored to the ground or to a suitable rigid support as hereinabove discussed. It also is to be noted that the fastener means 19 permit the ready assembly and disassembly of the support means from the wire framework for carrying the same in a compact manner. The height of the pole above the ground or boat gunnel may be easily adjusted by the axial disposition of the leg portions 32,32 along the strap member 20 inasmuch as such leg portions are slidable beneath the washers 40 of the fastener means.

Of particular importance and significance in the operation of the present invention is the adjustable clamping of the leg portions 32 to the mounting strap member 20. The degree of pressure exerted against the legs is fully adjustable by tightening of the fastener means 19 which thereby regulate frictional engagement between such leg portions 32 and the opposing faces of the strap 20 and washer 40 engaged thereby.

It is essential to the successful operation of this holder that the leg portions 32 be rotatable or movable about longitudinal axes with respect to the stationary strap member. Freedom for such rotation is adjustably regulated in accordance with the tightening or loosening of the fastener means 19. In brief, the greater the tightness of the fastener means the greater the frictional engagement between the leg portions 32 and the strap member. This in turn increases the resistance to rotational movement of the framework leg portions. Conversely, by loosening the wingnuts 42, greater freedom of rotation for such leg portions is brought about.

Figure 6:
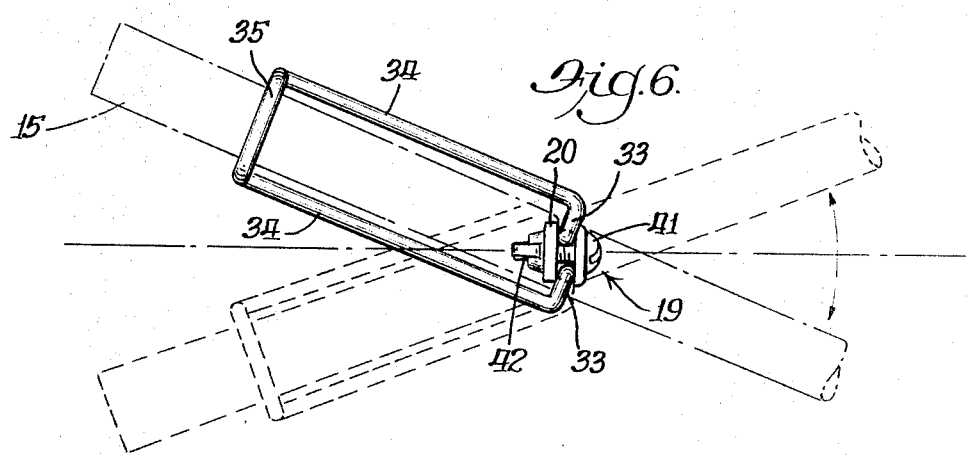
FIG. 6 is another top plan view thereof, illustrating normal pivoting positions of the pole holder.

As shown in FIG. 6, by way of example, adjustment of the fastener means may be such that the holder permits a relatively free degree of flexibility allowing the pole 15 to pivot through substantially 180°, relative to the anchored mounting means. In this operation, the divergent yoke arm portions 33,33 under the influence of the turning moment imposed on the holder by the pole, as when a hooked fish is running, act as lever arms to torsionally twist the downwardly extending leg portions 32,32 of the holder. Depending on the frictional engagement between the washer and the adjacent face of the stake member 20, the leg portions 32 of the wire framework rotates freely or are limited by frictional drag.

Figure 5:
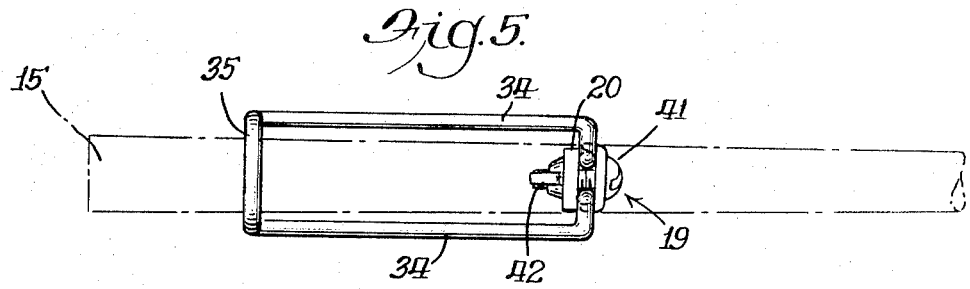
FIG. 5 is a top plan view of the pole holder seen in FIGS. 2 and 3.

When the leg portions are free to rotate, or substantially so, with little or no drag imposed thereon, the twisting action imposed on the holder framework by the swinging movements of the pole creates a situation wherein the elasticity or resiliency of the framework material has a marked tendency to snap the holder framework back to a neutral position, in which the pole is aligned generally out over the mounting means (FIG. 5). This condition permits the pole in the holder to not only follow and play the movements of the running fish, but to positively set the hook with the resilient snapback activity imposed by the framework. On the other hand, if the fastener means 19 are tightened somewhat to impose a substantial frictional drag on the rotating activity of the leg portions 32,32, the pivoting movements of the framework 18 still obtain but at a slower rate, with a definite frictional resistance to swinging movements of the pole. In this mode of operation the line is held taut against the running activity of the fish and greatly assists in tiring the fish.

Figure 7:
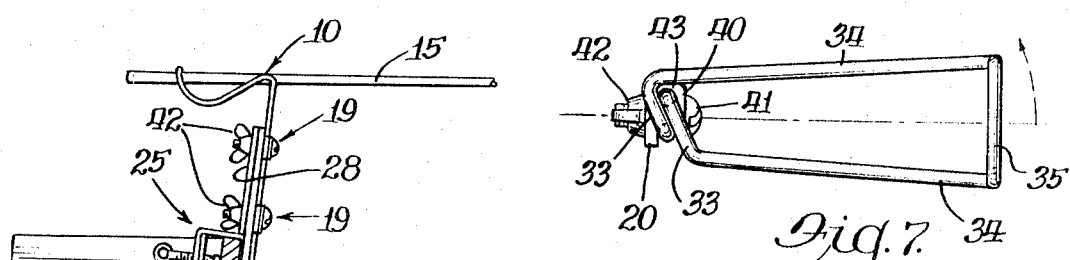
FIG. 7 is a top plan view of the holder pivoted to a locked position.

As best illustrated in FIG. 7, when it is desired to remove the pole from the holder, as when rebaiting the line, the fisherman may twist the holder substantially 180° from the neutral FIG. 5 position, which creates an overlapping of the divergent arm portions 33,33 forming the open throat or yoke portion of the holder. In such overlapped state, the arm portions serve to maintain the holder in a locked condition until the fisherman reverses the twisting condition and returns the pole and holder to the normal pivotal operating condition illustrated in FIG. 6.

The present invention as hereinbove described may be embodied in other specific forms than those illustrated in the accompanying drawings without departing from the spirit or potential attributes thereof. Thus, accordingly, reference should be had to the appended claims as an indication of the scope of this invention.

I claim:

1. A fishing pole holder comprising: mounting means for securing the holder in a fixed position, a holder framework having means engageable with axially spaced areas on opposite sides of a pole for removably holding the same in angling position in the holder, said framework including a pair of parallel spaced depending support legs, a pair of divergent arm portions extending outwardly from the upper ends of said legs to provide an open, generally Y-shaped yoke seat resiliently receptive of said pole and engageable with the underside thereof, and a pair of finger portions extending angularly from the outer ends of said arm portions and interjoined by a semicircular loop portion, closed at its upper side and lying in a plane generally paralleling said yoke seat for overlyingly engaging the butt end of a pole, said loop portion and yoke seat cooperating to removably secure the pole in said framework; and fastener means frictionally joining said legs on said mounting means in a manner permitting said legs to rotate independently about parallel spaced axes thereby to afford limited pivotal movement of said framework and a pole mounted therein relative to said mounting means.

2. The combination of claim 1, wherein said fastener means comprise means frictionally clamping said legs to said mounting means, and means for adjustably regulating frictional clamping engagement between said legs, said mounting means and said fastener means.

3. The combination of claim 1, wherein said fastener means slidably mount said legs, permitting axial positioning of said legs relative to said mounting means.

4. A pole holder in accordance with claim 1, wherein said framework is formed of a single length of resilient material, said framework torsionally twisting upon rotation of said legs and elastically resisting said twisting to bias said pole automatically toward a centered position of alignment with respect to said mounting means.

5. A pole holder in accordance with claim 4, wherein said fastener means adjustably vary the torsional twisting and elastic resistance of said framework.

6. A pole holder in accordance with claim 2, wherein said fastener means include a washer member and a threaded fastener, said legs being held between said mounting means and washer member by said fastener passing through said washer member and mounting means and between said legs, said washer member having flanges turned toward said mounting means to hold said legs adjacent said fastener.

7. A pole holder in accordance with claim 1, wherein said mounting means comprises an elongated stake having a pointed lower end whereby the same may be driven into the ground.

8. A pole holder in accordance with claim 1, wherein said mounting means comprises a bracket having means for removably clamping said holder to the side of the boat.